United States Patent
Merey-Marzat et al.

(10) Patent No.: US 8,892,925 B2
(45) Date of Patent: Nov. 18, 2014

(54) METHOD AND DEVICE FOR CONTROLLING THE AWAKING OF FACILITIES BELONGING TO AT LEAST ONE MULTIPLEXED NETWORK, BY COUNTING UNTIMELY WAKE-UPS

(75) Inventors: Matthieu Merey-Marzat, Linas (FR); Antony Boisserie, Wissous (FR); Vincent Sollier, Montrouge (FR)

(73) Assignee: Peugeot Citroën Automobiles SA, Velizy Villacoublay (FR)

( * ) Notice: Subject to any disclaimer, the term of this patent is extended or adjusted under 35 U.S.C. 154(b) by 732 days.

(21) Appl. No.: 13/144,670

(22) PCT Filed: Dec. 21, 2009

(86) PCT No.: PCT/FR2009/052650
§ 371 (c)(1),
(2), (4) Date: Jul. 14, 2011

(87) PCT Pub. No.: WO2010/081954
PCT Pub. Date: Jul. 22, 2010

(65) Prior Publication Data
US 2011/0271132 A1    Nov. 3, 2011

(30) Foreign Application Priority Data
Jan. 15, 2009    (FR) ...................................... 09 50207

(51) Int. Cl.
*G06F 1/32*     (2006.01)
*H04L 12/40*    (2006.01)
(52) U.S. Cl.
CPC . *H04L 12/40039* (2013.01); *H04L 2012/40215* (2013.01); *H04L 2012/40234* (2013.01)
USPC ........... 713/323; 713/300; 713/310; 713/320; 713/321; 713/322; 713/324; 713/330; 713/340

(58) Field of Classification Search
USPC .................. 713/300, 310, 320–324, 330, 340
See application file for complete search history.

(56) References Cited

U.S. PATENT DOCUMENTS 5,525,992 A * 6/1996 Froschermeier ............. 340/10.2
(Continued)

FOREIGN PATENT DOCUMENTS

| DE | 102 46 337 B3 | 5/2004 |
| DE | 103 58 584 A1 | 7/2004 |
| WO | 0142054 A | 6/2001 |

OTHER PUBLICATIONS

International Search Report corresponding to International Application No. PCT/FR2009/052650, mailed Mar. 10, 2010.

*Primary Examiner* — M Elamin
(74) *Attorney, Agent, or Firm* — Polster, Lieder, Woodruff & Lucchesi, L.C.

(57) ABSTRACT

A device (D) is dedicated to the control of the waking of facilities (OE11-OE23) forming part of an assembly of at least one multiplexed network (R1-R2) managed by a management facility (OM). This device (D) is charged, when the management facility (OM) has detected a wake-up of the facilities (OE21-OE23) of a multiplexed network (R2) of the assembly, with determining the current value of a counter, and if this current value is greater than or equal to a chosen threshold, with not requesting confirmation of wake-up and with ordering that the facilities (OE11-OE13) of the assembly of multiplexed network(s) (R1-R2) be kept asleep for as long as this current value is less than the chosen threshold or with incrementing the current value by one unit and ordering that the facilities (OE11-OE13) of the assembly of multiplexed network(s) (R1-R2) be kept asleep if wake-up is not confirmed, or with setting the current value to zero and authorizing the wake-up of the facilities (OE11-OE23) of the assembly of multiplexed network(s) (R1-R2) if the wake-up is confirmed.

6 Claims, 1 Drawing Sheet

(56) References Cited

U.S. PATENT DOCUMENTS

| | | |
|---|---|---|
| 6,812,589 B1 | 11/2004 | Fey et al. |
| 6,819,252 B2 * | 11/2004 | Johnston et al. ............ 340/630 |
| 7,721,071 B2 * | 5/2010 | Jiang ............................ 712/217 |
| 7,765,352 B2 * | 7/2010 | Pudipeddi et al. ............ 710/261 |
| 7,941,682 B2 * | 5/2011 | Adams ......................... 713/322 |
| 8,170,045 B2 * | 5/2012 | Pan et al. ..................... 370/429 |
| 8,363,635 B2 * | 1/2013 | Liu ............................... 370/350 |
| 2007/0204135 A1 * | 8/2007 | Jiang ............................ 712/214 |
| 2009/0319712 A1 * | 12/2009 | Pudipeddi et al. ............ 710/261 |

* cited by examiner

METHOD AND DEVICE FOR CONTROLLING THE AWAKING OF FACILITIES BELONGING TO AT LEAST ONE MULTIPLEXED NETWORK, BY COUNTING UNTIMELY WAKE-UPS

CROSS-REFERENCE TO RELATED APPLICATIONS

This application is the US national stage under 35 U.S.C. §371 of International Application No. PCT/FR2009/052650 which claims the priority to French application 0950207 filed on Jan. 15, 2009.

BACKGROUND

The invention relates to groups of multiplexed communication networks such as for instance so-called local interconnection networks (or LIN (for "Local Interconnection Network")) or CAN type networks ("Controller Area Network") or FlexRay type networks, especially used in some automotive vehicles.

A "group of multiplexed networks" is understood here to be a group of at least one multiplexed communication network comprising at least one device (called a slave device in the case of a LIN network) connected to a bus to which is also connected a master control device (called master device (or node) in the case of a LIN network). The master device is specifically tasked with putting to sleep or waking of the devices of the group of multiplexed networks.

When the devices (or nodes) of a group of multiplexed networks are placed in sleep mode (at the request of the master device), they automatically wakeup upon detection of an activity on their bus. This activity requiring waking of other devices normally originates from a device, potentially from the master device, but can also be generated by the presence of parasites. It is indeed assumed that an activity exists on the bus when a so-called "recessive-dominant" transition is detected followed by a dominant state during a time greater than a threshold (several tens of μsec in the case of a CAN network). The dominant state ("or logical low") is the electrical level of the network corresponding to a logical "0". Inversely, the recessive state (or "logical high") is the electrical level of the network corresponding to a logical "1". The logical level "0" is called dominant level because it takes priority when several devices try to impose different levels. Consequently, any voluntary or involuntary phenomenon generating a recessive-dominant transition followed by a dominant state during a time greater than the threshold is considered by a device as an activity that must lead to its wakeup.

When the master device detects an activity on the bus, it must immediately determine whether another device is effectively at the origin of this activity. If the master device obtains a wakeup confirmation from an activating device, it will then authorize the devices to stay awake. In the contrary case (parasites) the master device must command the controlled devices to return to sleep mode. It is clear that if the parasites originate from a defective device of one multiplexed network of the group, all the devices of the multiplexed network of the group can become the object of alternating sleep and wakeup phases, causing overconsumption of electricity by the network, which in turn can provoke discharge of the battery (in case of installation in an automotive vehicle) and this discharge can be accelerated in case the wakeups propagate to the other multiplexed networks of the group.

BRIEF SUMMARY

The goal of the invention is therefore to improve this situation.

To this end, it is proposing a method dedicated to controlling the waking of devices in a group of at least one multiplexed communication network managed by a master device; and in case of detection by the master device, the method comprises waking the devices of one multiplexed network of the group, determining the current value of a counter, and if this current value is greater than or equal to a selected threshold, not to request confirmation of the wakeup and to command the devices of the group of multiplexed networks to remain in sleep state, while if this current value is smaller than the selected threshold, either increment the current value by one unit and command the devices of the group of multiplexed networks to remain in sleep state if the wakeup is not confirmed, or reset to zero the current value and authorize the wakeup of the devices of the group of multiplexed networks if the wakeup is confirmed.

Furthermore, in case the master device receives a local wakeup request, the current value of the counter can be reset to zero and the wakeup of the devices of the group of multiplexed networks will be authorized, because a local wakeup request from the master device must always be authorized.

The invention also is proposing a control device, intended to be part of (or connected to) the master device, responsible for managing a group of at least one multiplexed network comprising at least one device, and arranged in such manner that, in case of detection by the master device of a wakeup of the devices of one multiplexed network of the group, the control device will determine the current value of a counter, and if this current value is greater than or equal to a selected threshold it will command the devices of the group of multiplexed networks to remain in a sleep state, while if this current value is lower than a selected threshold the control device will either increment by one unit the current value and command the devices of the group of multiplexed networks to remain in a sleep state if the wakeup is not confirmed, or reset to zero the current value and authorize the wakeup of the devices of the group of multiplexed networks if the wakeup is confirmed.

In case the master device receives a local wakeup request, this device can also be arranged for resetting to zero the current value of the counter and authorizing the wakeup of the devices of the group of multiplexed networks.

The invention also is proposing a master device responsible for managing a group of multiplexed networks and equipped with a control device of the above discussed type.

The invention is particularly well suited for, although not limited to, applications where the master device is common to several multiplexed communication networks. Indeed, the invention allows the confinement of parasitic wakeup requests to a single multiplexed network of a group in order not to wake all other multiplexed networks of this group.

Furthermore, the invention is particularly well suited for, although not limited to, multiplexed networks selected among local interconnection networks (or LIN (for Local Interconnection Network)); CAN type networks (Controller Area Network) and FlexRay type networks.

BRIEF DESCRIPTION OF THE SEVERAL VIEWS OF THE DRAWINGS

Other characteristics and advantages of the invention will become clear by examining the following detailed description, and attached drawings, in which.

The attached drawings are useful not only for describing the invention, but also for its definition, if necessary.

DETAILED DESCRIPTION

The goal of the invention is to offer a method and an associated device for controlling the waking of devices belonging to a group of multiplexed communication networks.

In the following, it is assumed, as a non-limiting example, that the group of multiplexed communication networks is on board of an automotive vehicle, for instance a car. However, the invention is not limited to this application. It relates in fact to all groups of multiplexed networks, and in particular to networks comprising, for instance, at least one CAN, LIN or FlexRay type network.

Figure 1:
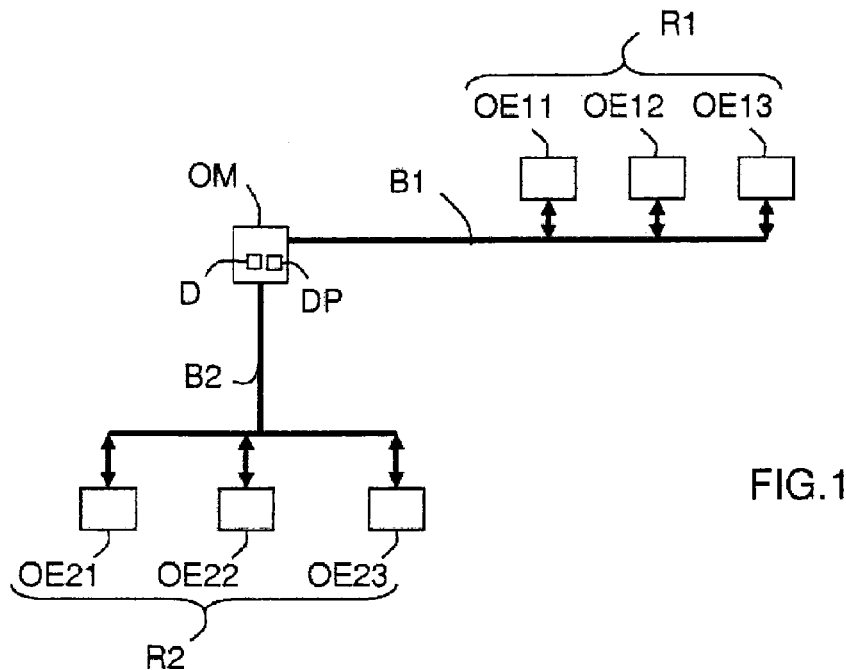
FIG. 1 schematically illustrates a group of two multiplexed networks, for instance CAN or LIN type networks, managed by a master device equipped with a control device according to the invention, and FIG. 2 schematically illustrates an example of an algorithm allowing the implementation of a control method according to the invention.

FIG. 1 schematically shows a non-limiting example of a group of two multiplexed (communication) networks R1 and R2 (i=1 or 2) connected to a master device (or node) (or management device) OM. The first multiplexed network R1 comprises a bus B1 (i=1) connected to the master device OM and to which are connected three devices (or slave nodes) OE11 to OE13 (i=1, j=1 to 3). The second multiplexed network R2 comprises a bus B2 (i=2) connected to the master device OM and to which are connected three devices (or slave nodes) OE21 to OE23 (i=2, j=1 to 3).

To be noted, on the one hand, that the group related to the invention can comprise only one multiplexed network or more than two multiplexed networks, and, on the other hand, that a multiplexed network of a group according to the invention can contain only one device (or node) or more than one device (or node).

The master device (or node) OM and the devices (or slave nodes) OEij can be of any type. For instance, in the case of a car they can be can be devices, equipment or components of the climate control system or window operating system or door lock system.

According to the invention, the method for controlling the wakeup of OEij devices is implemented at the level of the master device OM by means of a control device D. As illustrated in non-limiting manner, this device D can be an integral part of the master device OM. But, in a variant, it can be coupled to the master device OM. Because of this, a device D can be constructed in the form a software modules (or data processing), or electronic circuits, or a combination of electronic circuits and software modules. To be noted that the control device D can be considered to be a programmable controller.

Figure 2:
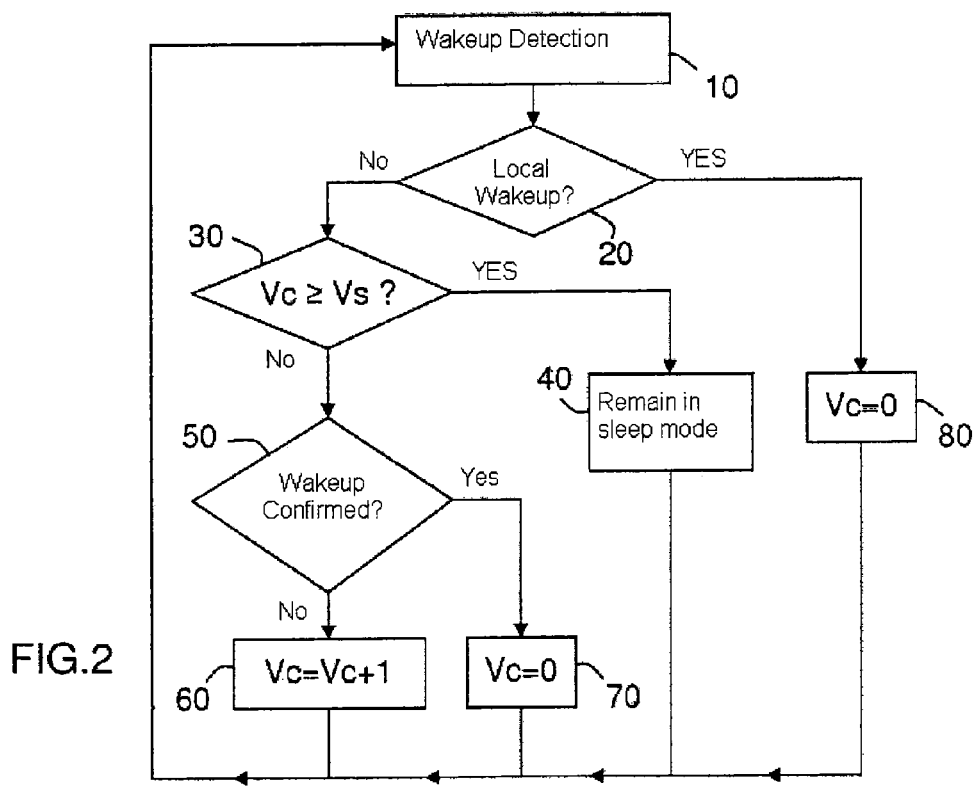

The method of the invention will now be presented in detail with reference to the algorithm of FIG. 2. The method is carried out each time the master device OM detects a wakeup of devices OEij of a multiplexed network (for instance R2) of the group of multiplexed networks. To be noted that the master device OM disposes of a main device DP (or programmable controller) responsible for managing the different life phases (waking and sleeping) of devices OEij of each multiplexed network Ri. It is therefore this main device (or programmable controller) DP that alerts the control device D when it detects a wakeup on the bus (for instance B2).

To be noted that the control device D can also be part of the main device DP.

When the control device D is alerted of the detection of a wakeup in step 10, it determines in step 30 the current value Vc of a counter.

To be noted, as illustrated, it is preferred that the control device D perform in an intermediate step 20, situated between steps 10 and 30, a test in order to determine whether the detected wakeup originates from an OEij device of a multiplexed network Ri (it is called then network wakeup) or from the master device OM (it is called then a local wakeup provoked by an applicative event or an event detected in a direct input of the master device OM).

If the test of step 20 indicates that the wakeup is originating from a multiplexed network Ri (here R2), in step 30 the control device D makes a comparison between the current value Vc and the selected threshold Vs. This threshold Vs is for instance equal to 5 and represents the maximum number of successive aborted (or unjustified) wakeups that will be tolerated before proceeding with the interdiction of network wakeups coming from the multiplexed network Ri (here R2).

If the current value Vc is greater than or equal to a selected threshold Vs (Vc≥Vs), then the control device D will not request confirmation of the wakeup and will command all the devices OEij of the multiplexed networks Ri of the group to remain in sleep mode. This is intended to limit all activity once the threshold is reached.

At the end of this step 40, the method according to the invention comes to an end. The control device D can then receive a new warning of wakeup detection in the course of a new step 10.

If the current value Vc is smaller than the selected threshold Vs (Vc<Vs), the device performs in step 50 a test to determine whether the detected network wakeup is (was) confirmed. For this purpose, it queries the main device DP, which in the meantime has made this determination in known manner, for instance by verifying the wakeup requesting message of the activator element OEij.

If the network wakeup is not confirmed, the control device D is informed by the main device DP, and in step 60 it increments by one unit the current value Vc of the counter (Vc=Vc+1). Then, it commands devices OEij (i=2 and j=1 to 3) of the (second) multiplexed network R2 to remain in sleep mode. In fact, it can either warn the main device (or programmable controller) DP of the fact that the wakeup is authorized (because the threshold Vs has not yet been reached) and therefore to do nothing, or not intervene with the main device DP, which is the same warning to do nothing.

At the end of step 60, the method according to the invention comes to an end. The control device D then can receive a new detection warning in the course of a new step 10.

If the network wakeup is confirmed, the control device D is warned by the main device DP. Since the wakeup was justified by the device that triggered it, the control device D has no reason to prohibit it. It goes then through step 70 in which it resets to zero (0) the current value Vc of the counter (Vc=0), which authorizes again the wakeup of the devices of the (second) multiplexed network Ri (here R2). In fact, it can either warn the main device DP (or programmable controller) of the fact that the wakeup is authorized (since the current value Vc is now null) and therefore to do nothing, or not intervene with the main device DP, which is the same warning to do nothing. It is understood that the resetting to zero of the value Vc of the counter is intended to again allow network wakeups if the wakeups were previously prohibited due to the fact that the last current value Vc exceeded the threshold Vs.

At the end of step 70, the method according to the invention comes to an end. The control device D can receive then a new wakeup detection warning in the course of a new step 10.

If the test of step 20 indicates that the wakeup is local (and therefore that it does not originate from a device other than the master device OM of the multiplexed networks Ri), then in step 80 the control device D resets to zero the current value Vc of the counter and authorizes the wakeup of the devices of the multiplexed networks Ri (R1 and R2). In fact, it can either warn the main device DP (or programmable controller) of the fact that the wakeup is authorized (since the current value Vc is now zero) and therefore that it must do nothing, or not intervene with the main device DP, which is the same warning to do nothing. It is understood that this resetting to zero of the value Vc of the counter is intended to again allow network wakeups if the wakeups were previously prohibited due to the fact that the last current value Vc exceeded the threshold.

At the end of step 80, the method according to the invention comes to an end. The control device D can receive then a new wakeup detection warning in the course of a new step 10.

Thanks to the invention, a malfunction of a device, translated into successive aborted (or unjustified) wakeups, can be confined to the multiplexed network containing this defective device, as soon as the number of non-confirmed successive network wakeups exceeds the threshold value. The other multiplexed networks of the group of multiplexed networks are therefore not unnecessarily wakened and the electrical consumption of this group can be limited to the consumption of the multiplexed network containing the defective element.

The invention is not limited to the implementation modes of the above described control method, control device and master device, which were provided only as examples, but it encompasses all variants that a person skilled in the art will be able to envisage within the framework of the following claims.

The invention claimed is:

1. A method for controlling the waking of devices of a group of at least one multiplexed communication network managed by a master device, the method comprising, in the case of detection by said master device of a wakeup of the devices of one multiplexed network of the group, determining a current value of a counter, and
   if said current value is greater than or equal to a selected threshold not to request confirmation of said wakeup and to command the devices of the group of multiplexed networks to remain in sleep mode,
   if this current value is smaller than said selected threshold, incrementing by one said current value and commanding the devices of the group of multiplexed networks to remain in sleep mode if said wakeup is not confirmed, or resetting to zero said current value and authorizing the wakeup of the devices of the group of multiplexed networks if said wakeup is confirmed.

2. The method according to claim 1, wherein, when said master device receives a local wakeup request, said current value of the counter is reset to zero and the wakeup of the devices of the group of multiplexed networks is authorized.

3. A control device for waking devices of a group of at least one multiplexed communication network managed by a master device, wherein, when said master device detects a wakeup of the devices of one multiplexed network of the group, the control device will determine the current value of a counter, and
   if this current value is greater than or equal to a selected threshold it will command the devices of the group of multiplexed networks to remain in sleep mode,
   if this current value is smaller than said selected threshold the control device will either increment by one unit said current value and command the devices of the group of multiplexed networks to remain in sleep mode if said wakeup is not confirmed, or it will reset to zero said current value and authorize the wakeup of the devices of the group of multiplexed networks if said wakeup is confirmed.

4. The control device according to claim 3, wherein, when said master device receives a local wakeup request, it will reset to zero said current value of the counter and authorize the wakeup of the devices of the group of multiplexed networks.

5. A master device for a group of at least one multiplexed network, wherein the master device comprises a control device according to claim 3.

6. A method of controlling the waking up of devices of a group of at least one multiplexed communication network in a product; the product comprising devices of the group of at least one multiplexed communication network, a master device and a control device; the at least one multiplexed network selected among a group comprising at least one CAN type network, one local interconnection network (LIN) and one FlexRay type network; the master device comprising or managing a control device to control the waking of the devices; said method comprising:
   the master device detecting a wakeup of at least one of the devices of one multiplexed network of the group;
   the control device determining a current value of a counter, and
   if this current value is greater than or equal to a selected threshold commanding the devices of the group of multiplexed networks to remain in sleep mode,
   if this current value is smaller than said selected threshold either incrementing by one unit said current value and commanding the devices of the group of multiplexed networks to remain in sleep mode if said wakeup is not confirmed, or resetting to zero the current value of said counter and authorizing the wakeup of the devices of the group of multiplexed networks if said wakeup is confirmed.

* * * * *